US007423528B2

(12) United States Patent
Otto

(10) Patent No.: US 7,423,528 B2
(45) Date of Patent: Sep. 9, 2008

(54) WIRELESS EMERGENCY RESPONSE SYSTEM

(76) Inventor: Kevin L. Otto, 908 Oklahoma Ave., Milwaukee, WI (US) 53215

(*) Notice: Subject to any disclaimer, the term of this patent is extended or adjusted under 35 U.S.C. 154(b) by 0 days.

(21) Appl. No.: 11/053,375

(22) Filed: Feb. 8, 2005

(65) Prior Publication Data
US 2005/0174232 A1 Aug. 11, 2005

Related U.S. Application Data

(60) Provisional application No. 60/542,919, filed on Feb. 9, 2004.

(51) Int. Cl.
G08B 1/08 (2006.01)
H04B 1/38 (2006.01)
H04M 1/00 (2006.01)
(52) U.S. Cl. .................... 340/539.17; 340/539.1; 340/539.11; 340/539.16; 455/73; 455/83; 455/550.1

(58) Field of Classification Search ............ None
See application file for complete search history.

(56) References Cited

U.S. PATENT DOCUMENTS

2004/0192362 A1* 9/2004 Vicari ................. 455/507

* cited by examiner

Primary Examiner—Julie Lieu
(74) Attorney, Agent, or Firm—Andrus, Sceales, Starke & Sawall, LLP

(57) ABSTRACT

A emergency response system including a remote module and a command module in communication with each other via a wireless communication link. The remote module includes a wireless communication circuit for receiving and transmitting wireless signals to the command module. The remote module includes a plurality of speakers for transmitting the received signal from the command module. The command module includes a wireless communication circuit for receiving information from the remote module and transmitting messages to the remote module. The wireless communication link between the remote module and the command module is a full-duplex circuit.

18 Claims, 4 Drawing Sheets

WIRELESS EMERGENCY RESPONSE SYSTEM

CROSS-REFERENCE TO RELATED APPLICATIONS

The present application is based on and claims priority to U.S. Provisional Patent Application Ser. No. 60/542,919, filed on Feb. 9, 2004.

BACKGROUND AND SUMMARY OF THE INVENTION

The present invention relates to an emergency response system to provide secure communication between an emergency response team and a subject. More specifically, the present invention relates to a wireless emergency response system that allows a command module to wirelessly communicate to one of a plurality of remote modules.

Law enforcement agencies and emergency response teams are frequently confronted with situations in which a suspect has barricaded himself in a particular location and it is impractical for the response team to enter that location without risking the safety of hostages, the safety of the suspect or those in the immediate vicinity. In this type of situation, it is oftentimes necessary for the response team to communicate with the suspect in order to determine the suspect's demands and requests.

In the past, many types of negotiation units have been used in connection with existing telephone wires to speak with the suspect. When utilizing the prior art systems, the law enforcement agency typically taps into the existing phone wires and the suspect uses the telephone located in the building in which the suspect is located. However, this type of prior hostage negotiation unit has several drawbacks, in that the communication with the suspect may not be secure or there may not be an existing telephone in the building in which hostages are being held.

To address several of these problems, direct connected emergency response systems including two telephone handsets hard wired together are used. In this type of system, one of the handsets is thrown into the building, while the second handset is retained by the law enforcement agency or emergency response team. Through this hard wire connection, the law enforcement agency can contact and communicate with the suspect holding the hostages. An example of this type of system is shown in the applicant's prior U.S. Pat. No. 6,442,240, the subject matter of which is incorporated herein by reference.

While this type of system has worked reasonably well, it is desired to enhance the emergency response system to provide the law enforcement agency or response team with a wireless system to increase the flexibility of the system and eliminate the restrictions of a hardwired connection.

It is therefore a feature of the present invention to provide an emergency response system having a command module used by the emergency response team that is in wireless communication with one or more remote modules to be provided to or near the suspect.

SUMMARY OF THE INVENTION

The present invention is an emergency response system that allows an emergency response team or law enforcement agency to communicate with a suspect using wireless communication. The emergency response system includes at least one remote module in communication with a command module by a wireless communication link. The remote modules of the emergency response system each include multiple speakers and at least one internal microphone such that the suspect can speak to a law enforcement agent positioned near the command module without the use of a handset or headset.

The remote module includes a rugged outer casing having a main body portion and a cover. The multiple speakers and microphones are contained within the remote module when the cover is closed.

The command module of the emergency response system includes a control panel that allows the response team to select one of multiple addresses for communication to multiple remote modules. The control panel of the command unit includes multiple headphone jacks and a primary headset connection.

The emergency response system provides for two-way full duplex wireless communication between the command module and each of the plurality of remote modules. The two-way wireless communication link is accomplished through a two-way full duplex circuit that allows communication between the master transceiver circuit board contained within the command module and a slave transceiver circuit board included in each of the remote modules.

Each of the remote modules includes an address switch that assigns a unique address to each of the plurality of remote modules. A selection switch on the command module allows a user to select which of the remote modules will communicate with the control module at any given time. Preferably, each of the master and slave transceiver boards is a 900 MHz encrypted system that can transmit at least 1,000 feet in any direction. The two-way full duplex communication between the command module and each of the remote modules allows for open communication between the master and slave transceiver boards without any loss of the signal. Preferably, both the command module and the remote module are powered by a 12 volt self-contained battery and include a corresponding voltage regulation circuit. The voltage regulation circuit regulates the battery supply voltage to a 9 VDC for supply to the transceiver circuit boards.

It should be understood that the numerous features identified above can be incorporated in an almost unlimited number of combinations within the emergency response system, based on the desired feature required by the law enforcement agency or response team using the unit. Additionally, it is contemplated that all of the above-identified features could be incorporated into a single emergency response system suitable for use by any type of law enforcement agency. Finally, it should be understood that although the system of the invention is described as being used in a hostage negotiation situation, it could also be used in any type of crisis situation, such as with a suicidal person.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
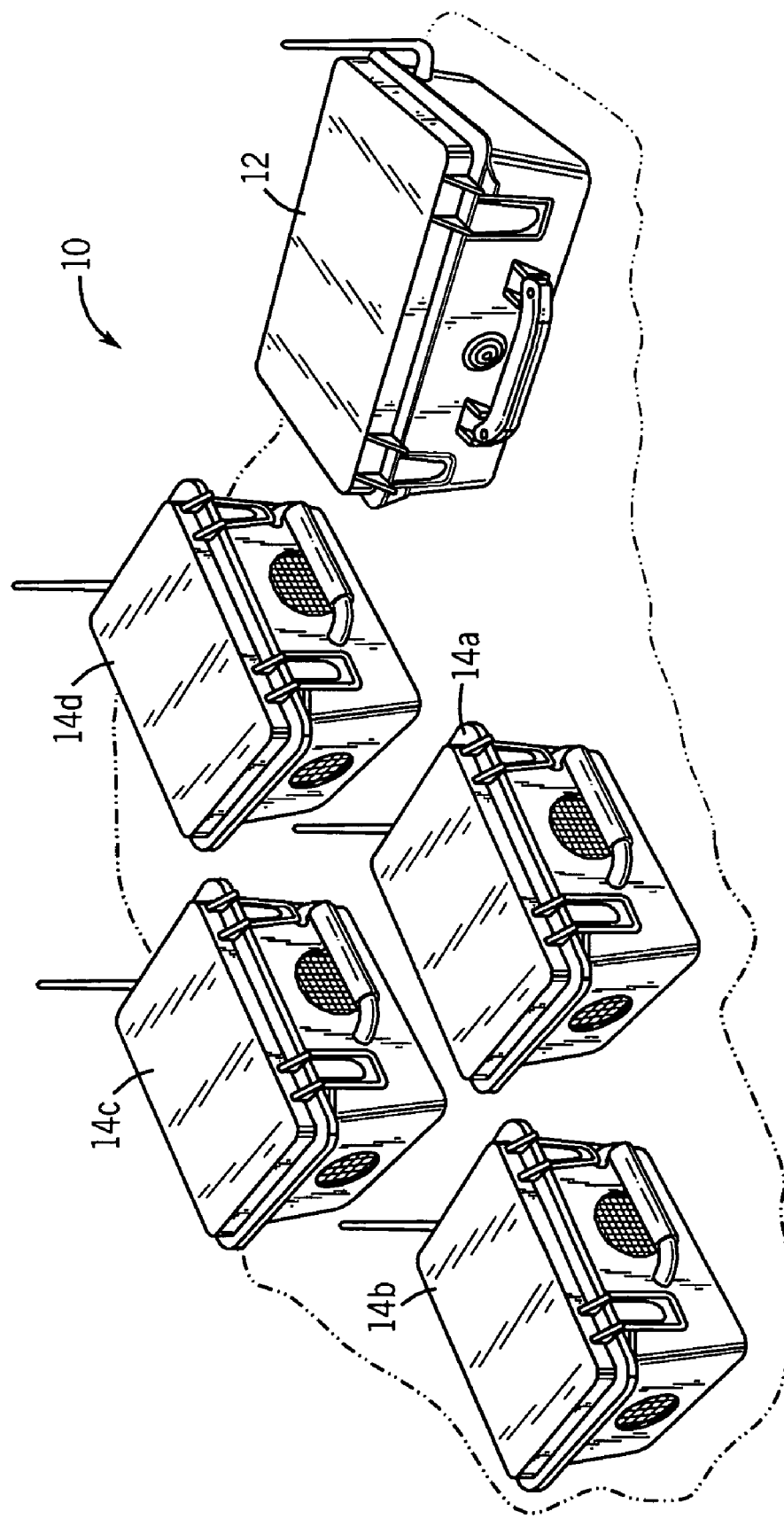
FIG. 1 illustrates an emergency response system of the present invention, including a plurality of remote modules and a command module in wireless communication with the remote modules.

FIG. 1 illustrates the emergency response system 10 of the present invention. The emergency response system 10 includes a command module 12 and a plurality of remote modules 14. In the embodiment of the invention illustrated in FIG. 1, the emergency response system 10 is shown as including four separate remote modules 14a, 14b, 14c and 14d. Although four remote modules 14 are shown, it should be understood that the emergency response system 10 of the present invention can be implemented with fewer than the four remote modules 14a-d or can be configured to utilize more than four separate remote modules.

The emergency response system 10 of the present invention is configured such that the command module 12 is in communication with the remote modules 14 by a wireless communication link. The wireless communication link allows the remote modules 14 to communicate directly to the command module 12 without external wiring existing between the units. In use, one of the remote modules 14 can be thrown into a building in which hostages are being held or some other type of emergency situation exists or can be placed near a subject to which law enforcement personnel wish to communicate. After the remote module 14 has been deployed, the command module 12 remains at a remote location and can be used by an emergency response team or law enforcement agents to communicate with the suspect located near the remote module 14.

In accordance with the present invention, the wireless communication between the remote modules 14 and the command module 12 utilizes a two-way full duplex communication protocol operating at 900 MHz. The two-way full duplex wireless communication protocol allows the command module 12 to communicate with the remote modules 14 utilizing an open communication link such that voices and sounds can be simultaneously communicated between the two units without any losses. Preferably, the two-way full duplex communication between the command module 12 and the remote module 14 is encrypted such that the information being transmitted cannot be easily intercepted. Although a 900 MHz digitally encrypted signal is contemplated in the preferred embodiment of the invention, other frequencies are contemplated as being within the scope of the present invention.

Figure 2:
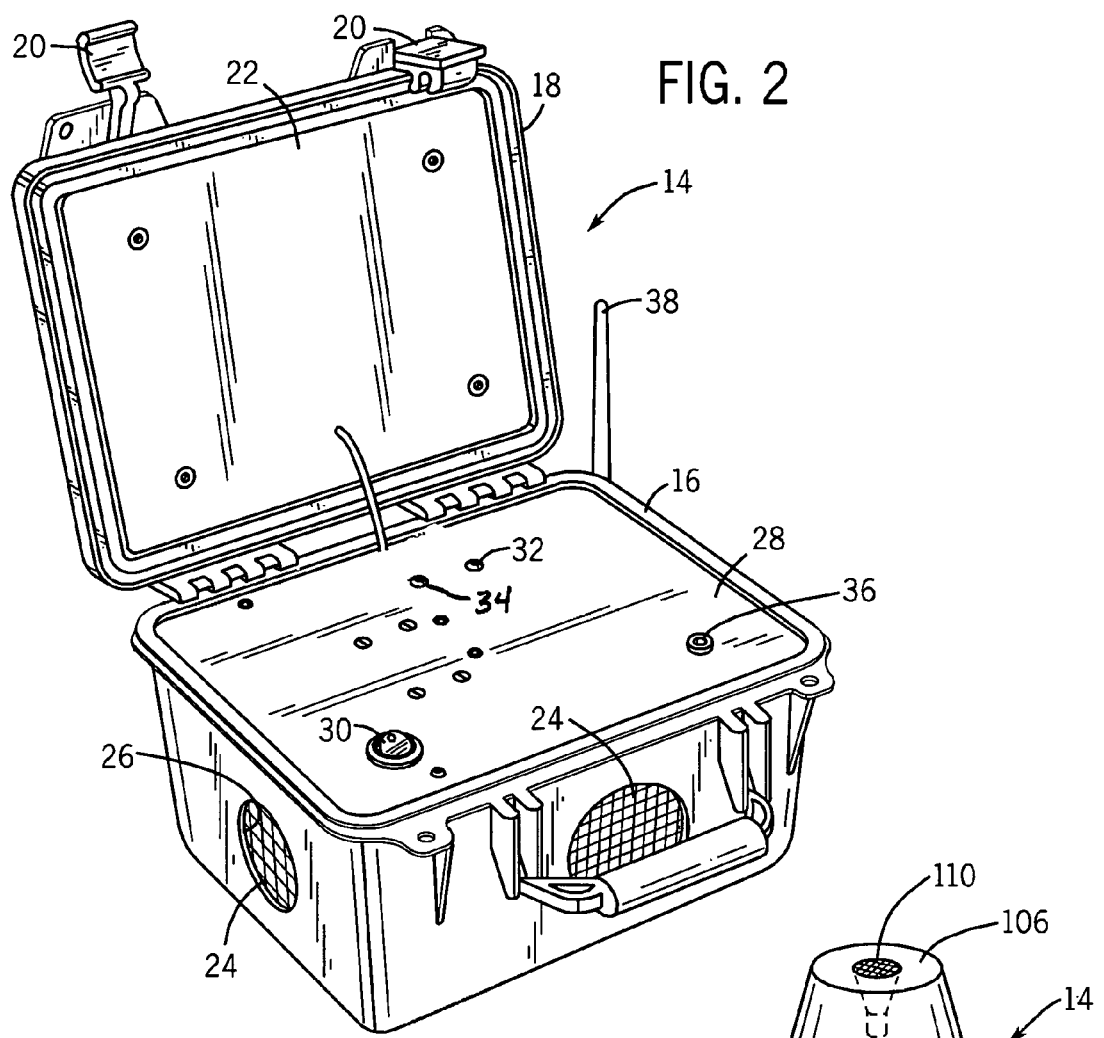
FIG. 2 is a perspective view of one of the remote modules of the emergency response system.

Referring now to FIG. 2, the remote module 14 of the preferred embodiment of the invention is shown. In the preferred embodiment, the remote module 14 includes a rugged, virtually indestructible outer casing having a main body portion 16 and a cover 18. As can be seen in FIG. 2, the cover 18 includes a pair of latches 20 that secure the cover 18 in a closed position to facilitate movement and transportation of the remote module 14. The inner surface of the cover 18 includes a generally flat face plate 22 that faces outward when the cover 18 is opened.

As shown in FIG. 2, the main body portion 16 includes a speaker 24 exposed along each side of the remote module 14. Each of the speakers 24 is aligned behind an opening 26 removed from the sidewall of the remote module 14. Thus, each of the four speakers 24 can be heard through the outer wall of the remote module when the cover 18 is in the closed position. In the embodiment of the invention illustrated, the remote module 14 includes four separate speakers 24 that allow audible sounds to be heard regardless of the positioning of the remote module 14 in a building. However, additional speakers are contemplated as being within the scope of the present invention.

The main body 16 of the remote module 14 includes a face plate 28 that generally conceals the operating components for the remote module 14. The face plate 28 includes a power switch 30 that activates the remote module 14. Typically, the power switch 30 is activated by an emergency response team or law enforcement personnel prior to presenting the remote module 14 into the building or area occupied by the subject. The face plate 28 also includes an in-use LED 32 and a power LED 34. A DC charger port 36 provides an input for a DC charger such that the internal battery (not shown) of the remote module 14 can be quickly and easily charged.

As shown in FIG. 2, the throw module 14 includes an external antenna 38 that allows the remote module 14 to communicate using the wireless communication link. In the embodiment of the invention illustrated in FIG. 2, the antenna 38 is external to the main body 16. However, it is contemplated that the antenna 38 may be contained within the main body 16 while operating within the scope of the present invention. Although not shown in FIG. 2, the remote module 14 includes at least one high powered microphone contained within the cover 18. The concealed microphone picks up sounds made in the vicinity of the remote module 14 when the cover is in the open or closed positions.

Figure 3:
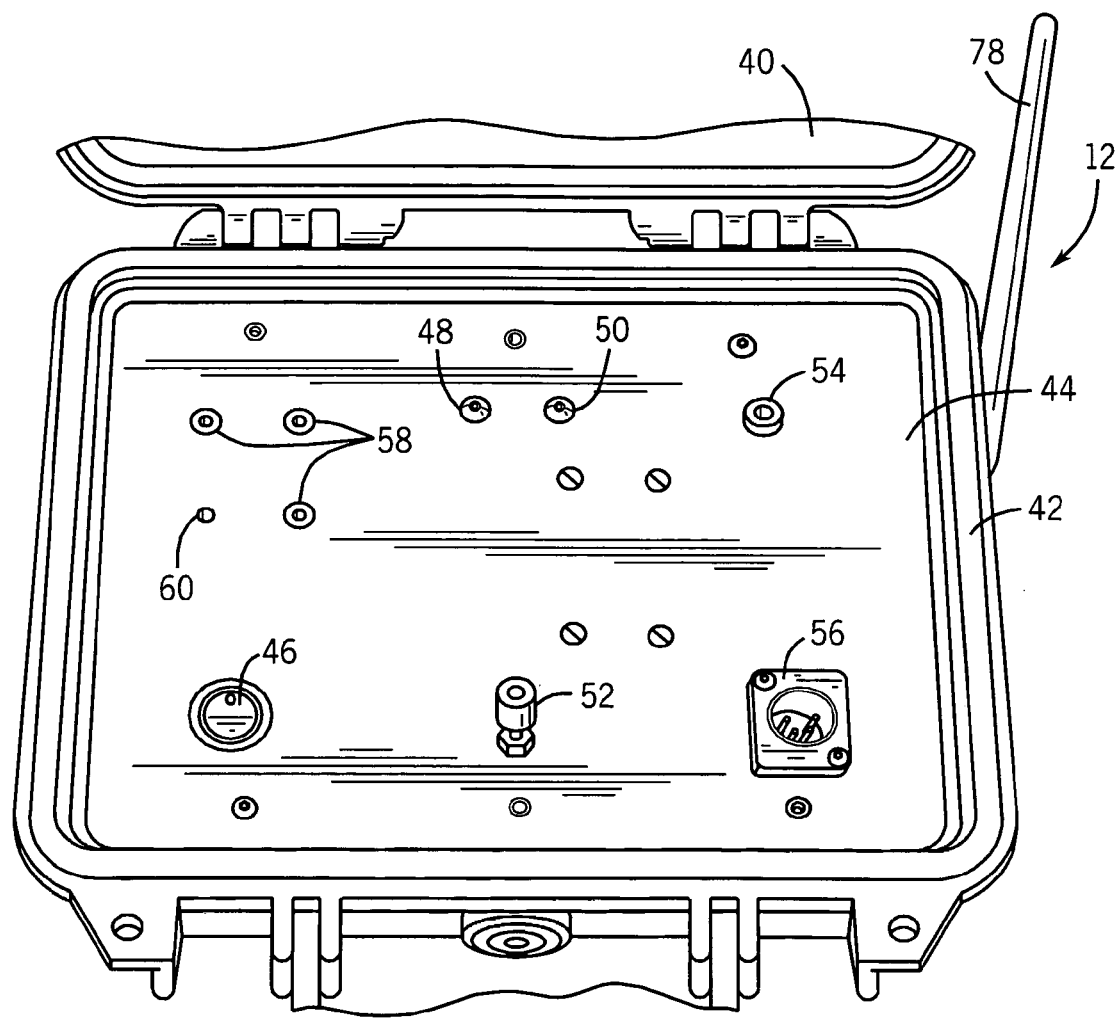
FIG. 3 is a perspective view of the command module of the emergency response system.

Referring now to FIG. 3, thereshown is the command module 12 with the cover 40 in an open position. As illustrated in this view, the body 42 includes a relatively smooth face plate 44 that includes various operating components for the command module. Specifically, the face plate 44 includes an on/off switch 46, a red power LED 48 and a green in-use LED 50. The command module 12 includes a control pushbutton switch 52 that allows the emergency response team or law enforcement personnel to select one of the remote modules to which the command module 12 is communicating. The command module 12 includes a DC charger port 54 for charging the internal battery and operating the unit from an automobile battery. A headset port 56 allows the command module 12 to communicate with a headset or other listening device. The headset port 56 allows both the delivery of audible signals to the headset and the receipt of voices from the microphone included in the headset. Finally, the face plate 44 includes three headphone jacks 58 and a tape recorder jack 60. The three headphone jacks 58 and the tape recorder jack 60 allow for additional personnel to listen into the conversation received by the command module 12 and also permits the recording of the communication received by the command module 12.

Figure 4:
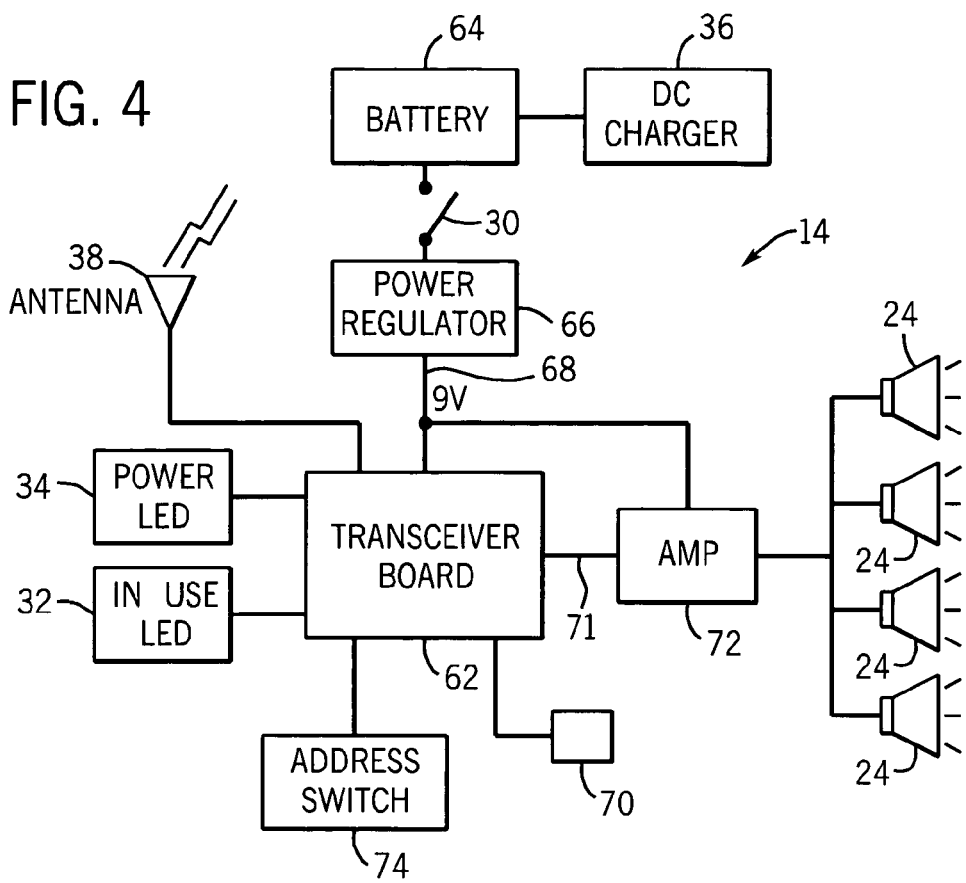
FIG. 4 is a schematic diagram of the internal circuitry of the remote module.

Referring now to FIG. 4, thereshown is a schematic illustration of the internal components used to operate the remote module 14. The operation of the remote module 14 is controlled by a slave transceiver board 62. The slave transceiver board 62 is a commercially available component that is operable to receive and transmit RF signals through the antenna 38. In the embodiment of the invention illustrated, the slave transceiver board 62 transmits digitally scrambled signals at 900 MHz through use of the antenna 38. Likewise, the slave transceiver board 62 can receive and descramble signals received by the antenna 38. In the preferred embodiment of the invention, the slave transceiver board 62 is the Voyager CL-2200XP/SST communication system available from Anco.

As illustrated in FIG. 4, the transceiver board 62 receives power from an internal battery 64 through the power regulator circuit 66. In the embodiment of the invention illustrated, the battery 64 is a rechargeable 12 volt nickel metal hydride battery. However, other types of batteries, such as a lead-acid battery, can be utilized within the scope of the present invention. The DC charger 36 allows the battery 64 to be charged upon depletion. The power switch 30 is positioned between the battery 64 and the power regulator 66 such that when the power switch 30 is in the open, off position, the battery 64 does not discharge to the power regulator 66. The power regulator 66 operates to create a generally constant 9 volt DC power supply on line 68 which is supplied to the slave transceiver board 62.

The slave transceiver board 62 receives an input signal from microphone 70. Microphone 70 is preferably concealed within the cover 18 of the remote module 14 and picks up voices and other sounds within the immediate area surrounding the remote module. Although the preferred embodiment of the invention shown in FIG. 4 includes only a single microphone 70, it is contemplated that multiple microphones could be utilized and positioned at different locations within the remote module 14. Although not shown in the Figures, it is contemplated that the remote module could include a handset within the enclosure that would allow the suspect to speak to the command module. In such a contemplated embodiment, when the handset is picked up off of the receiver, the external speakers would be disabled to provide the suspect a more private method of communication.

When a voice or other input sound is received by the microphone 70, the slave transceiver board 62 transmits the sound as an RF signal through the antenna 38. The RF signal including the voice and sound can be received and broadcast by the remotely located command module 12.

In addition to sending sensed sounds received by the microphone 70, the slave transceiver board 62 receives RF incoming signals from the command module 12 by the antenna 38. When the slave transceiver board 62 receives the incoming sound information, the slave transceiver board 62 generates an output signal on output line 71 to the speakers 24 through amplifier 72. The amplifier 72 boosts the power of the output signal from the slave transceiver board 62 such that the slave transceiver board 62 can power the multiple speakers 24. As illustrated in FIG. 2, the speakers 24 are end accessible through the side walls of the remote module 14 such that the sound generated by the speakers 24 can be heard by a suspect near the remote module 14.

As discussed previously, the emergency response system 10 of the present invention can include a plurality of remote modules 14. Since it is desirable to have the command module communicate to only one of the remote modules 14 at any given time, an address switch 74 is coupled to the slave transceiver board 62. In the preferred embodiment of the invention, the address switch 74 includes several DIP switches that allow a user to assign a unique address to each of the remote modules 14. Thus, when the command module is transmitting a signal, the signal includes an address indicator such that only the remote module 14 with the correct address will broadcast the signal being transmitted by the command module.

The transceiver board 62 operates both the in-use LED 32 and the power LED 34 to provide an indication of whether the remote module 14 is in use and whether the battery 64 is providing adequate power to the slave transceiver board 62.

Figure 5:
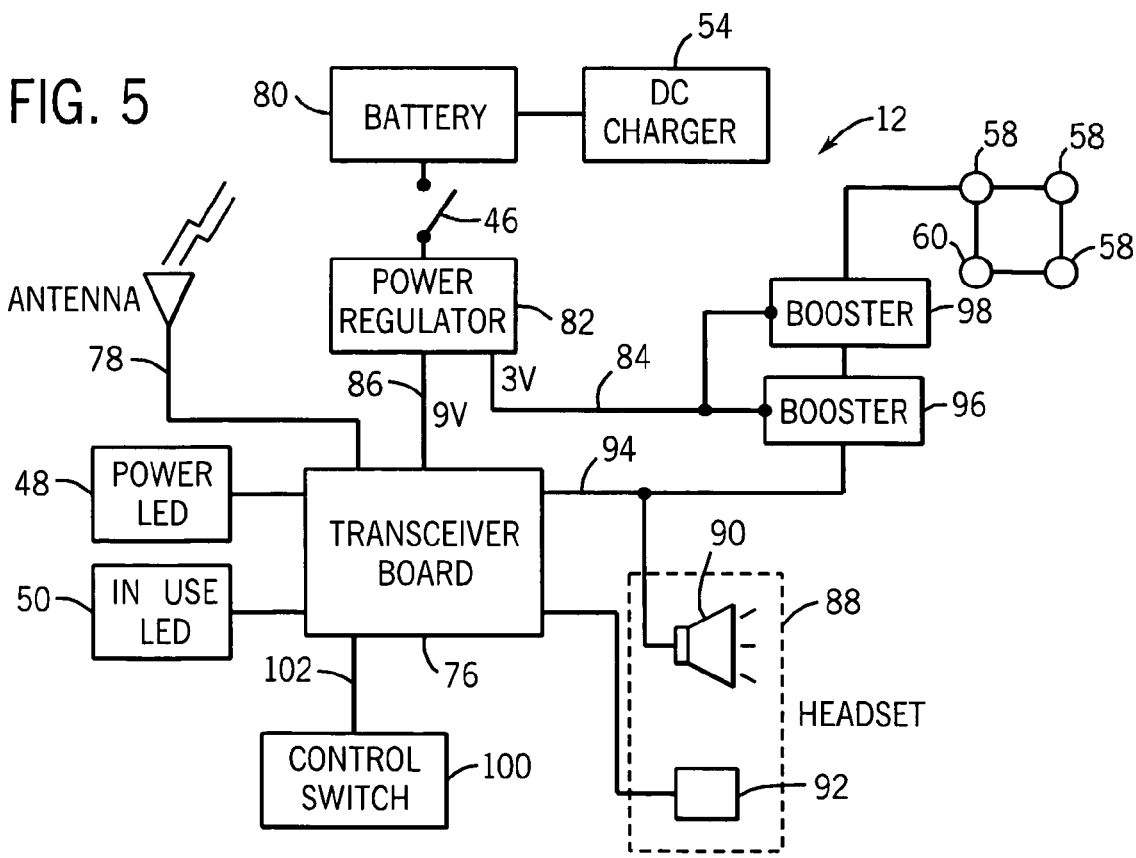
FIG. 5 is a schematic diagram of the internal circuitry of the command module.

Referring now to FIG. 5, thereshown is a schematic illustration of the internal circuitry used to operate the command module 12. The command module 12 includes a master transceiver board 76 that is configured to communicate with the slave transceiver boards 62 of each of the remote modules 14. The transceiver board 76 is a conventional component, such as the Voyager CL-2200XP/SST sold by Anco. The master transceiver board 76 is configured to broadcast digitally encrypted RF signals at 900 MHz.

The master transceiver board 76 operates from a battery 80 through a power regulator circuit 82. In the preferred embodiment of the invention, the battery 80 is a 12 Volt nickel metal hydride battery, although other types of batteries are contemplated as being within the scope of the present invention. The battery 80 is connected to the power regulator 82 through the on/off switch 46. When the on/off switch is in the open, off position, the battery 80 is prevented from discharging through the power regulator 82. The power regulator 82 is configured to provide a regulated 3 Volt DC output at line 84 and a 9 Volt DC output at line 86 that is used to power the master transceiver board 76. The DC charger 54 allows the battery 80 to be charged when required.

The master transceiver board 76 operates both the in-use LED 50 and the power LED 48 in a conventional manner. As described previously, a headset 88 can be connected to the command module 12 through the headset port 56. The headset 88 includes an internal speaker 90 and a boom microphone 92. The microphone 92 is connected to the master transceiver board 76 such that the transceiver board transmits the audio signals received from the microphone through the antenna 78. Likewise, when the master transceiver board 76 receives incoming RF messages from the antenna 78, the incoming messages are broadcast by the headset speaker 90. The audio output on line 94 from the master transceiver board 76 drives the headset speaker 90 and is fed to a pair of booster circuits 96 and 98. The booster circuits 96 and 98 are powered from the 3 Volt DC output line 84 of the power regulator 82. The booster circuits 96, 98 amplify the audio output signal before the signal is applied to the three headphone jacks 58 and the tape recorder jack 60. The power boosters 96, 98 are required to drive the three headphone jacks 58 and the tape recorder jack 60. As illustrated, the three headphone jacks 58 and the taper recorder jack 60 are joined to each other such that the same signal is present at each of the jacks.

As discussed previously, the single command module 12 can be utilized to communicate to any one of a plurality of remote modules. In order to control the communication from the command module 12 to one of the remote modules 14, each of the remote modules 14 is assigned a unique address by utilizing the address switch 74, as previously described. The command module 12 includes a control switch 100 that provides an input on line 102 in the transceiver board 76. In the preferred embodiment of the invention, depression of the control switch 100 toggles the master transceiver board 76 between each of the plurality of addresses assigned to the remote modules. Thus, if a user wishes to communicate to the first remote module, the control switch 100 is depressed a single time. If the user wishes to communicate to the second remote module, the control switch 100 is depressed twice.

As is conventionally known, the output signals from the master transceiver board 76 include an address such that only the correct remote module receives and broadcasts the signal through its plurality of speakers 24. In this manner, only the desired remote module is in communication with the command module 12 at any given time. If the user wishes to toggle between multiple simultaneously deployed remote modules, the control switch 100 can be depressed to select which remote module should be transmitting and receiving.

As described previously, the communication between the slave transceiver board 62 of the remote module 14 (FIG. 4)

and the master transceiver board 76 of the command module 12 (FIG. 5) is a full-duplex communication channel. The full-duplex communication ensures that at any time each of the transceiver boards 62, 76 can be both sending and receiving information such that full-duplex communication can occur between the user at the command module 12 and the subject at remote module 14.

In the preferred embodiment of the invention, the communication between the command module 12 and each of the remote modules 14 is a 900 MHz encrypted system. The encrypted communication between the command module 12 and the remote module 14 ensures that the communication cannot be easily intercepted and overheard by interested parties.

During initial deployment of the emergency response system 10, the user initially turns on the power switch 30 on the remote module 14. Once the power switch 30 is turned on, the address switch 74 is adjusted to set the address for the remote module 14. Once the address is set, the control switch 100 is depressed the desired number of times to correspond to the assigned address for the remote module. Preferably, the communication link is tested and the remote module 12 can then be delivered to its desired location. In the preferred embodiment of the invention, the remote module 12 includes rubber shock absorbers located at its outside corners to protect the remote module 12 if it is thrown through a window or a door.

Once the remote module is in the building occupied by the subject, the control switch 100 on the command module 12 is activated to cause the command module to begin transmitting signals to the remote module. Preferably, the signals to be transmitted are received from the microphone 92 contained within the headset 88 connected to the master transceiver board 76.

The received signals at the remote module 14 are then broadcast through the plurality of speakers 24 such that the subject can hear the desired messages. The microphone 70 contained within the cover of the remote module 14 detects the subject's voice and other sounds in the immediate location surrounding the remote module. The detected sounds from the microphone 70 are transmitted through the antenna 38 back to the command module 12. In this way, two-way, full-duplex communication takes place between the remote module 14 and the command module 12.

In the embodiment of the invention illustrated in FIGS. 4 and 5, the communication between the remote module 14 and the command module 12 is described as taking place using a 900 MHz RF signal. It should be understood that the wireless communication between the command module 12 and the remote module 14 can take place using other types of communication or at different frequencies. As an example, it is contemplated that the RF communication could be replaced by full cellular communication while operating within the scope of the invention. With full cellular communication, the size of the internal batteries can be reduced and the external antennas can be moved within the module body. Alternatively, the RF communication can occur at different frequencies, such as 2.4 GHz.

Figure 6:
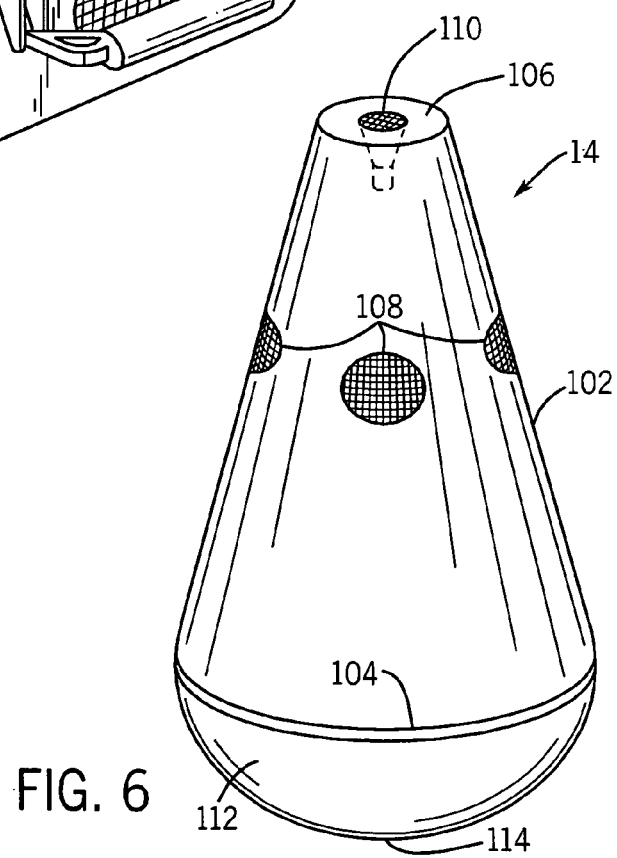
FIG. 6 is a perspective illustration of an alternate embodiment for the physical configuration of the remote module.

Referring now to FIG. 6, thereshown is an alternate configuration for the remote module 14. In this configuration, the remote module includes a body 102 having a generally frustoconical shape from a bottom edge 104 to a top edge 106. The series of speakers 108 are positioned around the middle of the body 102 and provide 360° communication from the remote module 14. The top end of the body 102 includes at least one microphone 110 for receiving information from the subject. As illustrated in FIG. 6, the remote module includes a weighted base 112 having a spherical bottom surface 114.

The weighted base 112 biases the remote module 14 into an upright position, as illustrated. The configuration illustrated in FIG. 6 further enhances the ability of the remote module 14 to maintain an upright position when the module is presented to a subject. In the alternate configuration shown in FIG. 6, the antenna for the RF communication can be located internally within the cylindrical body 102.

Although the present embodiment of the invention is described and discussed as including a command module and a remote module, it is contemplated that the remote modules could be utilized with a currently existing emergency response system, such as the direct link product sold by Enforcement Technology Group and embodied in U.S. Pat. No. 6,442,240. In this type of system, the command unit can be configured to include wireless communication capabilities and can be utilized with one or more of the remote modules 14.

I claim:

1. An emergency response system comprising:
   a remote module including a first wireless transceiver for receiving and transmitting messages, a microphone and a plurality of speakers for broadcasting the received messages, wherein the remote module includes a weighted base and a generally frustoconical body, wherein the weighted base biases the remote module into an upright position; and
   a command module including a second wireless transceiver for receiving messages from the remote module and transmitting messages to the remote module,
   wherein the remote module communicates with the command module over a full-duplex wireless communication link.

2. The emergency response system of claim 1 wherein the first wireless transceiver and the second wireless transceiver communicate over a radio frequency communication link.

3. The emergency response system of claim 1 wherein the plurality of speakers of the remote module broadcast the received messages such that the received messages can be heard in an area surrounding the remote module.

4. The emergency response system of claim 1 wherein the full-duplex communication link permits the simultaneous transmission and receipt of messages between the command module and the remote module.

5. The emergency response system of claim 1 wherein the command module includes a plurality of audible output jacks such that multiple persons can monitor the received messages.

6. The emergency response system of claim 1 wherein each of the speakers extend through the frustoconical body.

7. The emergency response system of claim 1 wherein the messages transmitted between the remote module and the command module are encrypted.

8. The emergency response system of claim 1 wherein both the remote module and the command module include an internal power supply.

9. An emergency response system, comprising:
   a plurality of remote modules each including an outer casing having a plurality of sidewalls and a cover, a first wireless transceiver for receiving and transmitting messages, a microphone concealed in the outer casing and a plurality of speakers for broadcasting the received messages, wherein the first wireless transceiver, the microphone and the plurality of speakers are contained within the outer casing such that the remote module can be deployed as a self contained unit, wherein each remote module has a unique address assigned to it, and;

a command module including a second wireless transceiver for receiving messages from the remote modules and transmitting messages to the remote modules, the command module including an address selection switch operable to select one of a plurality of addresses of the remote modules such that the command module receives messages and transmits messages to only the remote module having the selected address, wherein the remote modules communicate with the command module by a full-duplex wireless communication link.

10. The emergency response system of claim 9 wherein the first wireless transceiver and the second wireless transceiver communicate by a radio frequency communication link.

11. The emergency response system of claim 9 wherein the full-duplex communication link permits the simultaneous transmission and receipt of messages between the command module and one of the remote modules.

12. The emergency response system of claim 9 wherein the messages transmitted between the remote module and the command module are encrypted.

13. The emergency response system of claim 9 wherein each of the remote modules includes an address switch adjustable to assign the unique address to the remote module.

14. The emergency response system of claim 13 wherein the address selection switch on the command module allows the command module to communicate to all of the remote modules separately.

15. The emergency response system of claim 9 wherein each of the remote modules includes an internal power supply.

16. The emergency response system of claim 15 wherein the internal power supply is a nickel metal hydride battery.

17. An emergency response system, comprising: a plurality of remote modules each including a first wireless transceiver for receiving and transmitting messages, a microphone and a plurality of speakers for broadcasting the received messages, wherein at least one of the remote modules includes a weighted base and a generally frustoconical body, wherein the weighted base biases the remote module into an upright position, each remote module having a unique address;

a command module including a second wireless transceiver for receiving messages from the remote modules and transmitting messages to the remote modules, the command module including an address selection switch operable to select one of a plurality of addresses such that the command module receives messages and transmits messages to only the remote module having the selected address, wherein the remote modules communicate with the command module by a full-duplex wireless communication link.

18. The emergency response system of claim 17 wherein each of the speakers extends through the frusto conical body such that the messages broadcast by the speakers can be heard from an area surrounding the remote module.

* * * * *